No. 749,945. PATENTED JAN. 19, 1904.
P. NAEF.
PROCESS OF MANUFACTURING GAS.
APPLICATION FILED MAR. 14, 1899.
NO MODEL.
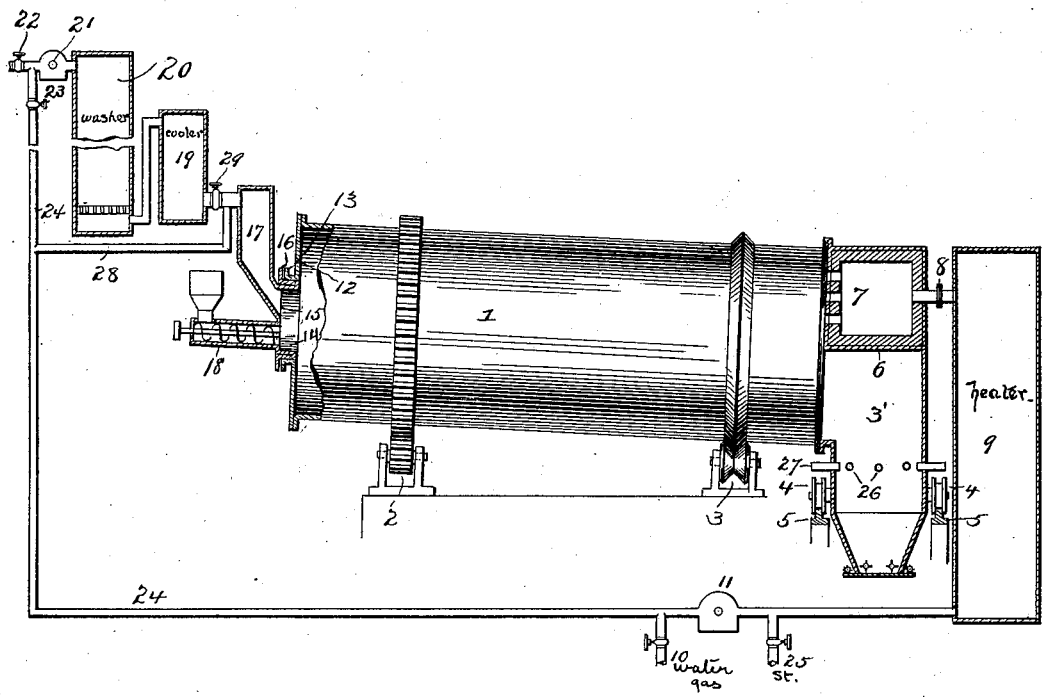
WITNESSES
E. J. Nottingham
G. F. Downing
INVENTOR
Paul Naef
By H. A. Seymour
Attorney No. 749,945.   Patented January 19, 1904.

UNITED STATES PATENT OFFICE.

PAUL NAEF, OF NEW YORK, N. Y.

PROCESS OF MANUFACTURING GAS.

SPECIFICATION forming part of Letters Patent No. 749,945, dated January 19, 1904.

Application filed March 14, 1899. Serial No. 709,099. (No specimens.)

*To all whom it may concern:*

Be it known that I, PAUL NAEF, Ph. D., a citizen of the United States, and a resident of 372 West One Hundred and Twentieth street, New York, in the county of New York and State of New York, have invented a certain new and useful Method of Making Gas, of which the following is a specification.

This invention relates to an improved process of treating bituminous fuel in the manufacture of gas containing practically no nitrogen, for heating or illuminating purposes, and in the manufacture of coke.

Objects of the invention are to devise a system of producing illuminating-gas by distillation of fuel which enables the treatment of larger quantities of fuel in one apparatus than possible in gas-retorts, to devise a method which can be put quicker into operation than ordinary gas-retorts, to produce more ammonia than is obtained in ordinary retorts, to prevent decomposition of ammonia to nitrogen during the distillation, and to devise a continuous illuminating-gas process.

With these objects in view the invention consists in certain novel steps in the process of making gas as hereinafter set forth, and pointed out in the claims.

The present invention is specially intended for the production of illuminating-gas containing little or no nitrogen.

The hot gas which is conducted through the fuel and effects the distillation is obtained by heating ordinary water-gas or other gas containing no nitrogen in suitable gas-heating stoves of any preferred form of construction, preferably to a temperature of about 1500° Fahrenheit. The hot gas from the heaters passes upward through the fuel. The volatile matter of the fuel is partly converted into tar, but mostly into gas containing illuminating hydrocarbons. The gas is cooled during its upward passage through the fuel and leaves the coking apparatus containing ammonia and tar and at a temperature not much higher than is necessary to prevent condensation of tar. It is passed through suitable washing apparatus to remove the ammonia. The gas resulting from my process may, if desired, be enriched to the required standard of illuminating power by any of the well-known methods. As it already contains illuminating hydrocarbons resulting from the decomposition of the volatile matter of the coal, less oil or naphtha will be required than in the ordinary water-gas process. For the purpose of still further increasing the volume of gas, as well as the amount of the by-product ammonia, it is advantageous to add a small amount of steam to the gas before it enters the heaters. The distillation will then take place in an atmosphere of water-gas and steam, and destruction of ammonia will be impossible. The steam will be mostly converted into water-gas during its passage through the fuel.

Compared with gas-retorts the process has the advantage that it acts very much quicker, furnishing much larger quantities of gas (and coke as a by-product) in one apparatus. Destruction of ammonia by overheating as it takes place in retorts where fuel is gradually heated to high temperature during a great length of time is practically excluded, thus enabling the recovery of a large amount of the by-product ammonia. The water-gas as it comes from the water-gas generators, already warm and usually containing some undecomposed steam, is conducted through the heater and afterward through the furnace containing the carbonaceous fuel. In cases where the water-gas generators could not be worked under sufficient pressure a blower would preferably be used to conduct the gas through the heater and furnace. In cases where the quality of the coke is of no or little importance—as for instance, if it is used for the production of steam in boilers or for water-gas—revolving furnaces can with advantage be used for carrying out my process.

The accompanying drawing illustrates one construction of apparatus by means of which my process can be carried into effect.

A revolving cylinder 1 is supported on rollers 2 and 3 and rotated in any suitable way. In the interior it is preferably fitted with agitating devices, such as partitions. At the lower end it closes against a box 3', supported on wheels 4, running on rails 5. It has a partition 6 separating the upper part 7, which is preferably lined with fireproof material and which has an inlet 8 for hot gas leading from gas-heater 9. Gas is supplied to the latter through a pipe 10 from any desired source by a blower 11. At the upper end the cylinder 1 has an end plate 12, with flange 13, which fits a flange 14, fastened to a stationary cover 15. Over the latter fits an adjustable ring 16, by which a packing placed between flanges 13 and 14 can be tightened. A dust-chamber 17 is connected with cylinder 1 through an opening in the end plate 15. The fuel-feed 18 communicates with the cylinder through another opening. From the dust-chamber 17 the gas passes through a cooler 19, washer 20, and fan 21. The latter delivers the washed gas through valve 22 for further uses. In most cases only the surplus gas passes off at 22, the rest being returned through valve 23 and pipe 24 to the heater. The proportion of gas passed through valve 22 for further use and the gas returned through pipe 24 depends on the volume of gas which is at disposal for effecting the distillation and can be regulated by valves 22 and 23.

The general main 10 usually leads from a water-gas generator. If desired, the process can be carried only with gas entirely returned through pipe 24. Steam-pipe 25 serves for regulating the quantity of steam admitted to the gas before it enters heater 9. For the purpose of acting on the nitrogenous compounds of the coke steam or steam and water are further introduced into vessel 3' through pipes 26, leading from main pipe 27. The steam is mostly decomposed to water-gas and passes on with the other gases through the cylinder. If the process has to be carried on without any fresh gas being supplied and when the recovery of by-products is not of very great importance, I use valve 29 and connection 28 to pipe 24. The process is then worked in such a manner that only the surplus gas is conducted through the washer. Valve 23 is then always shut and valve 22 open. Valve 29 is so adjusted that the desired amount of gas returns through pipe 28 to pipe 24.

One of the great advantages gained by using revolving furnaces for carrying out the process is that practically no resistance is offered to the passage of the gas and that any kind of a continuous heater can then be employed for heating the gas.

The method may be varied, so as to effect the best result under certain conditions, without departing from the spirit of the invention.

By the process herein described large quantities of coke can be made from bituminous fuel.

I do not in this case claim the apparatus herein described, but reserve the same to be claimed in a separate application for patent.

Having fully described my invention, what I claim as new, and desire to secure by Letters Patent, is—

1. The process of producing gas, which consists in passing a heated gas containing no nitrogen through a body of carbonaceous material to an extent sufficient only to absorb volatile matter from the fuel, and injecting steam and water into the fuel at a low level.

2. The continuous process consisting in passing heated water-gas mixed with steam through the fuel to distil therefrom illuminating-gas, treating the hot coke thus obtained with steam for the production of water-gas and ammonia, passing the said water-gas and ammonia through the fuel and mixing them with the gas distilled from the fuel, washing the gas thus derived for the recovery of by-products and delivering the coke into a generator for the water-gas to be used in the first step of the process, substantially in the manner and for the purpose specified.

3. The method which consists in injecting under pressure heated gas containing no nitrogen between the two ends of a column of fuel, passing the heated gas through the fuel, and then withdrawing the gas from and reheating and reinjecting some of it into the fuel, substantially as described.

4. The method which consists in injecting under pressure heated gas containing no nitrogen between the two ends of a column of fuel, passing the said gas through one half and withdrawing it at one end of the column of fuel, and treating the other half of the column of fuel (which consists of red-hot coke) with water, substantially as described.

5. The continuous process consisting in passing heated water-gas containing practically no nitrogen, mixed with steam through the fuel to distil therefrom illuminating-gas, treating the hot coke thus obtained with steam for the production of water-gas and ammonia, passing the said water-gas and ammonia through the fuel and mixing them with the gas distilled from the fuel, and washing the gas thus derived for the recovery of by-products, substantially in the manner and for the purpose specified.

Signed at New York, in the county of New York and State of New York, this 13th day of March, A. D. 1899.

PAUL NAEF.

Witnesses:
W. E. BROWER,
SAMUEL W. ROMAIN.